Patented Sept. 8, 1925.

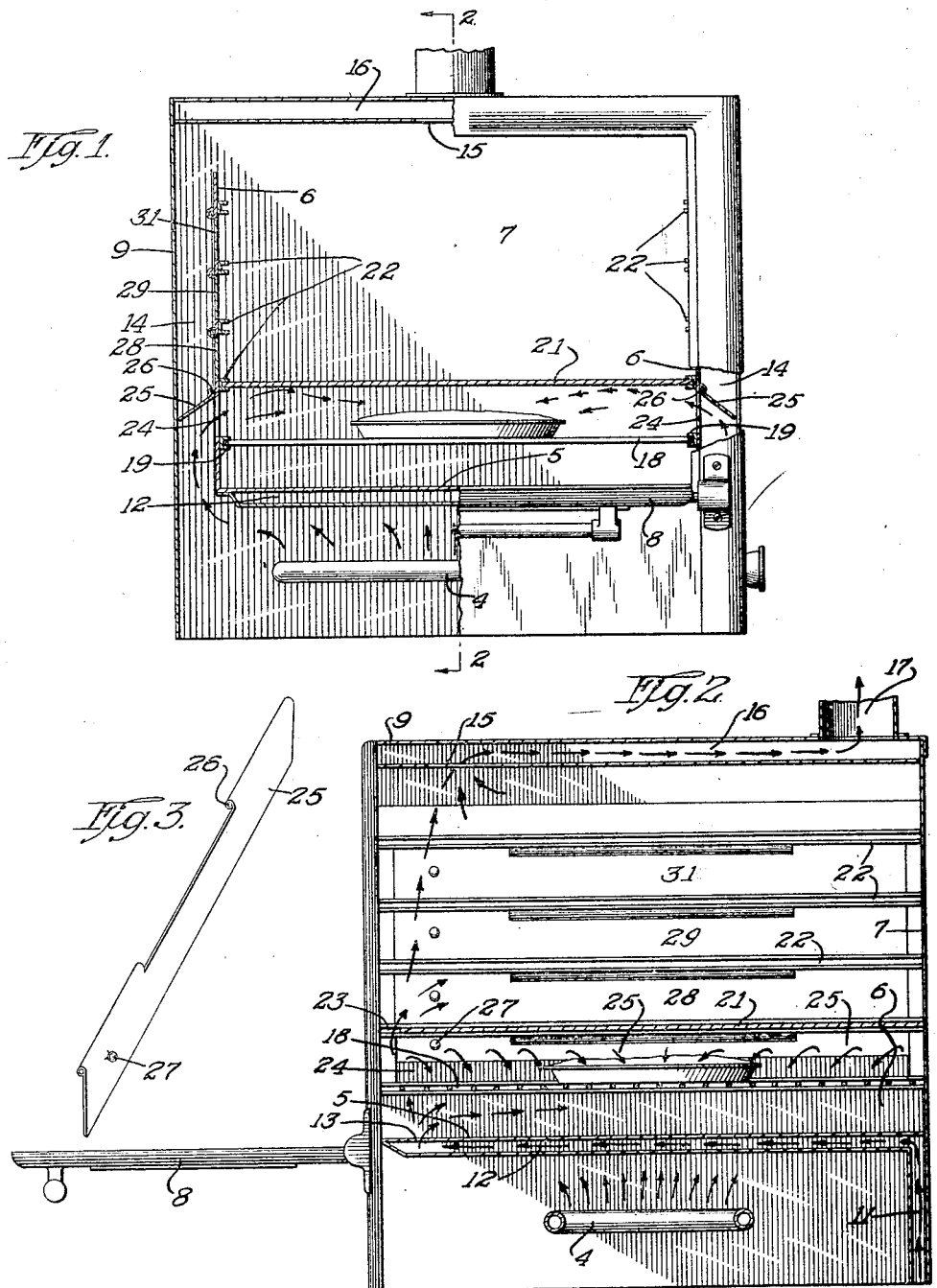

1,552,490

UNITED STATES PATENT OFFICE.

HARRY J. McCLAFFERTY, OF ROCKFORD, ILLINOIS, ASSIGNOR TO GEO. D. ROPER CORPORATION, OF ROCKFORD, ILLINOIS, A CORPORATION OF ILLINOIS.

COOKING APPARATUS.

Application filed February 26, 1923. Serial No. 621,283.

*To all whom it may concern:*

Be it known that I, HARRY J. McCLAFFERTY, a citizen of the United States, residing at Rockford, in the county of Winnebago and State of Illinois, have invented certain new and useful Improvements in Cooking Apparatus, of which the following is a specification.

This invention, relating in general to cooking apparatus, has more particular reference to baking and roasting ovens, heated by gas, oil and coal stoves and the like. Ovens of this kind on the market, especially for domestic use are very inefficient for the reason that it is necessary to heat to a high temperature a comparatively large cooking compartment, regardless of the size of the food container or the amount of food being cooked. It is well known that it requires only a certain amount of heat for a given length of time to produce the chemical changes necessary to convert the raw food into cooked food, and that heat generated in excess of this amount and for a longer period than required to produce such chemical changes, is waste. Consequently, the ordinary permanent size oven is wasteful in its fuel consumption, because a large excess of heat is necessary for cooking small quantities of food and because it is found that by far the greater amount of domestic baking comprises small dishes requiring only a portion of the oven capacity.

My invention provides an improved cooking apparatus of the character described to economize in fuel consumption and to enable more efficient baking and roasting. This general object I have attained by providing an oven variable in size, so that the cooking compartment may be limited in proportion to the nature and size of the food being cooked, and in further providing novel means for circulating the heat so that it may be utilized to the best advantage.

In furtherance of the foregoing, my invention contemplates in its preferred form, an oven inclosed in a suitable casing structure, side flues through which heated air rises and is adapted to enter the oven through one or more intermediate openings through the sides, and a movable partition adapted to be positioned at different heights in the oven for limiting the size of the cooking compartment therebelow, the heated air from said side flues entering the oven preferably just below the partition. This limitation of the cooking compartment and direct admission of heated air from the side flues in combination with a circulation of the heated air which will be described more fully hereinafter, secures proper cooking and browning of the food in a comparatively short time and without unnecessary waste of heat.

Other objects and attendant advantages will be appreciated by those skilled in this art as the invention becomes better understood by reference to the following description when considered in connection with the accompanying drawing, in which—

Figure 1 is a front view of an oven partly in vertical section, embodying my invention;

Fig. 2 is a sectional view through the oven taken substantially on the line 2—2 of Fig. 1; and Fig. 3 is a perspective view of one of the shutters.

The oven shown on the drawing is of a conventional type for domestic purpose heated by gas from one or more burners 4, although it should be observed that other fuels such as oil, or coal might be used for generating heat. It is preferred, however, that the heat shall be generated from a source directly beneath the bottom of the oven, so that it may be most efficiently employed for transmission by radiation from the oven bottom and walls and by convection, as when circulated with air.

The oven proper has a bottom 5, side walls 6, back wall 7 and a front opening adapted to be closed by a door 8. The top of the oven is open as shown, except for the casing structure, designated generally by 9, which incloses the oven proper.

In the preferred embodiment of my invention, I have provided a back flue 11 through which air is adapted to enter a bottom flue 12 immediately beneath the oven bottom 5. These flues reach from side to side of the oven and the fresh air passing therethrough will be heated by the burner and will enter the bottom of the oven through a series of openings 13 near the front thereof. This air passage along the bottom of the oven tempers the bottom which otherwise would be the hottest because of its proximity to the burner.

The heat rising from the burner is also carried into the oven through side flues 14 between the side walls 6 and the outer casing structure. These side flues reaching from front to back communicate at their lower ends directly with the burner compartment and at their upper ends with the open top of the oven. The waste products of combustion will escape through a top opening 15 and pass out through a top flue 16 and a flue outlet 17. This top flue outlet obviously induces a circulation through the oven, it being noted that the air entering the bottom of the oven through the flue 12, does not come in contact with the flame, but is brought to a high temperature by passing over the burner; and that the air heated directly by the flame and rising through the side flues enters the top of the oven, so that any waste products of combustion may immediately escape through the top outlet.

The food will be supported on one or more perforate trays 18, only one of which is shown at present, in turn supported on ledges 19 on the side walls 6. A partition 21 is adapted to be supported in the oven above the food tray at different heights, at present determined by the location of ledges 22 on the side walls. This partition being imperforate, causes the heat to be concentrated in the compartment there-below, although a suitable passage is provided around the partition, as for example, by allowing a space 23 between the front edge of such partition and the inner side of the door 8, for establishing communication with the upper part or compartment of the oven and with the flue outlet so as to insure the desired circulation. In practice, the partition 21 will be adjusted so as to reduce the cooking compartment to a minimum size commensurate with the size and shape of the food container and contents thereof. While such adjustment of the oven size might be made in various ways, it is found that for all practical purposes for domestic cooking, adjustment of the partition 21 on spaced ledges is sufficient and gives the beneficial results desired.

In each side wall 6, I have provided an opening 24 reaching substantially from front to back and positioned preferably between the ledges 19 and the lowermost ledges 22. These openings are adapted to be closed by shutters 25, which however, may be swung outwardly on their upper hinged end 26, so as to close the side flues and deflect the rising heated air from said side flues into the cooking compartment. These shutters may be swung back and forth by any suitable means, and at present I have for this purpose equipped each with a knob 27 located near the front and easily accessible through the door. I have also provided a series of shutters 28, 29 and 31 for closing openings in each side wall below the respective partition-supporting ledges. These shutters are adapted to function the same as the shutter 25 for opening their respective side wall passages and intercepting the rising heated air in the side flues and deflecting it into the oven.

It will be observed from the drawing that the partition 21 limits the cooking compartment therebelow to the smallest size in this particular case, practicable for domestic baking purposes. This restricted cooking compartment will be heated by radiation from the bottom and side walls which are subjected to heat from their outer sides, and by convection by the circulation of heated air from two sources, one the bottom flue 12 and the other the side flues 14. Practically all of the heat produced by the burner will be thus concentrated in the cooking compartment; and by reason of the circulation above described, said compartment will be ventilated and kept free from waste products of combustion. The compartment above the partition 21 will likewise be heated because of such circulation, thus preventing loss of heat by radiation from the top of the cooking compartment. By this method of heating, the cooking compartment may be quickly brought to the desired temperature and the food will be cooked in a comparatively short time without waste of heat as compared with ovens of those types in which a large cooking compartment must be heated regardless of the quantity of food being cooked. It will be further observed that the heated air entering the sides of the cooking compartment will be deflected inwardly and will serve to brown the top of the food. In the event that a higher cooking compartment is required, the partition 21 will be moved to the ledges next above, the shutters 25 will be closed and the shutters 28 opened, thus causing the rising heated air in the side flues to enter the cooking compartment directly beneath the partition and causing such air to be deflected down upon the food. When it is desired to utilize the full oven capacity for cooking, all of the shutters will be closed, causing the heated air rising in the side flues to enter the top of the oven. In this case the partition would preferably be removed.

It is believed that the foregoing conveys a clear understanding of the objects prefaced above and while I have shown but a single working embodiment, it should be understood that it is only for purpose of illustration and that the principles disclosed herein may be put into practice in other forms without departing from the spirit and scope of the invention as expressed in the appended claims, in which—

I claim:

1. Cooking apparatus comprising an open-top oven, a casing structure about the oven providing a bottom flue, side flues and a top flue outlet, heating means beneath the bottom flue, a partition vertically adjustable in the oven for varying the size of the cooking compartment beneath such partition, said bottom flue having an air inlet near the back of the oven and an outlet into the front portion of said cooking compartment, a passage connecting the oven compartments above and below said partition, said side flues having openings providing communication at their lower ends with said heating means, at their upper ends with the upper oven compartment, and intermediate their ends with said cooking compartment, said top flue having an inlet at the front and top of said oven, and means for closing said side flues and causing the rising heated air to enter said cooking compartment through said intermediate openings.

2. In combination, an oven the side walls of which have vertically spaced openings at definite levels, a burner compartment below the oven, a burner in said compartment, side flues through which heated air rises from the burner compartment and is adapted to enter the oven through said openings, shutters normally entirely closing said openings and each adapted to be moved to an open position in which to close its adjacent side flue and deflect the rising heated air into the oven, a horizontal partition vertically adjustable in the oven to any of a plurality of positions each just above the openings at a given level so as to limit the cubical contents of the cooking compartment below the partition, and a food supporting tray vertically adjustable in the oven and adapted for supporting food in the cooking compartment, whereby only the shutters just beneath the partition may be opened so that the heated air rising in the side flues will enter the cooking compartment only at the top thereof and will be directly deflected onto the top of the food.

3. In an oven, in combination, an oven proper, an outer casing enclosing the oven and having sides spaced outwardly from the side walls of the oven so as to provide vertical side flues, a burner compartment in said casing directly beneath the oven and open to the bottom of said side flues, a burner in said burner compartment, said oven side walls having opposed vertically spaced pairs of openings extending substantially from front to back of the oven, a shutter for each opening hinged near the upper end thereof so that it may be swung from a normal position in which it entirely closes its opening to a position extending into the side flue so as to deflect rising heated air into the oven, a horizontal partition adjustably mounted in the oven so that it may be positioned just above any one of said opposed pairs of openings to limit the cooking compartment below the partition, and a food supporting tray adapted to be supported at different elevations in the oven so that in any limited size of cooking compartment the food may be supported with its top in proximity to the partition so as to be disposed in the strata of heated air entering the oven through the side openings.

4. An oven comprising, in combination, an oven proper, an outer casing enclosing the oven, the side walls of the oven being spaced inwardly from the casing so that the space between said walls and casing provides vertical side flues, the space directly beneath the bottom of the oven providing a burner compartment open to the bottom of said side flues, a burner in said compartment, an under wall spaced beneath the oven bottom providing therewith a bottom air intake flue communicating at one end with the oven and through which fresh air is adapted to be drawn and heated before entering the oven, said under wall being directly above and exposed to uninterrupted rise of products of combustion from the burner so as to be directly heated thereby, each oven side wall having near the bottom an opening reaching substantially from front to back of the oven, a shutter in juxtaposition to and above each side wall opening and adapted in one position to close its said opening and in another position to open it and close the side flue so that heated air rising therein will be deflected by such shutter into the oven, a horizontal partition in the oven at the top of said side openings so as to limit the cubical contents of the cooking compartment to the space below said partition, a food supporting tray adapted to be supported at different elevations in the oven one of which positions is beneath said openings whereby to position the top of the food in the strata of heated air entering the oven through said side openings, said partition being removable from said position to enlarge the cubical contents of the cooking compartment, ledges on the side walls for supporting said tray at one or more higher elevations in the oven, said shutters being adapted to close said openings so as to prevent circulation therethrough, each side wall having an upper opening and shutter just below the partition at its upper location for deflecting said rising heated air inwardly into the oven when the lower shutters are closed.

HARRY J. McCLAFFERTY.